United States Patent
Dugaev et al.

(10) Patent No.: US 11,277,781 B2
(45) Date of Patent: Mar. 15, 2022

(54) METHOD OF ADAPTIVE ROUTE SELECTION IN A NODE OF A WIRELESS MESH COMMUNICATION NETWORK CORRESPONDING APPARATUS FOR PERFORMING THE METHOD OF ADAPTIVE ROUTE SELECTION AND CORRESPONDING COMPUTER PROGRAM

(71) Applicant: HOCHSCHULE ANHALT, Köthen (DE)

(72) Inventors: Dmitrii Dugaev, Köthen (DE); Eduard Siemens, Sehnde (DE)

(73) Assignee: HOCHSCHULE ANHALT, Kothen (DE)

( * ) Notice: Subject to any disclaimer, the term of this patent is extended or adjusted under 35 U.S.C. 154(b) by 0 days.

(21) Appl. No.: 16/967,137

(22) PCT Filed: Feb. 7, 2018

(86) PCT No.: PCT/EP2018/053015
§ 371 (c)(1),
(2) Date: Aug. 4, 2020

(87) PCT Pub. No.: WO2019/154483
PCT Pub. Date: Aug. 15, 2019

(65) Prior Publication Data
US 2020/0359296 A1    Nov. 12, 2020

(51) Int. Cl.
*H04W 40/12* (2009.01)
*H04B 17/318* (2015.01)
*H04W 84/18* (2009.01)

(52) U.S. Cl.
CPC .......... *H04W 40/12* (2013.01); *H04B 17/318* (2015.01); *H04W 84/18* (2013.01)

(58) Field of Classification Search
None
See application file for complete search history.

(56) References Cited

U.S. PATENT DOCUMENTS

| | | | |
|---|---|---|---|
| 8,149,715 B1 | 4/2012 | Goel et al. | |
| 2007/0019593 A1* | 1/2007 | Sarkar | H04L 45/34 370/338 |

(Continued)

FOREIGN PATENT DOCUMENTS

| | | |
|---|---|---|
| RU | 2565054 C2 | 10/2015 |
| WO | WO-2007/001286 A1 | 1/2007 |

(Continued)

OTHER PUBLICATIONS

Francoisse Kevin et al "A bag-of-paths framework for network data analysis", Neural Networks, vol. 90, Apr. 3, 2017, p. 90-111, XP085017901, ISSN: 0893-6080, DOI: 10.1016/J.NEUNET.2017. 03.010.

(Continued)

*Primary Examiner* — Brian S Roberts
(74) *Attorney, Agent, or Firm* — Moser Taboada (57) ABSTRACT

The proposal concerns a method of adaptive route selection in a node of a wireless mesh communication network. Such method is based on the Reinforcement Learning-based adaptive routing scheme. The proposal includes the idea of estimating initial reward values for the path discovery phase in dependence of the signal strength of the received signal and the number of hops the received route request message (RREQ) or route reply message (RREP) experienced during traversing in the network. Further improvements concern the idea of a feedback reward calculation for the routing absent the path discovery process as well as an improved method of route selection based on calculation of a temperature parameter for a Gibbs-Boltzmann distribution, which allows a dynamic adjustment of the node selection probabilities.

(Continued)

Another improvement concerns a part of the reward function calculation, related to an exponential fallback mechanism on packet loss events.

15 Claims, 8 Drawing Sheets

(56) References Cited

U.S. PATENT DOCUMENTS

2014/0222728 A1* 8/2014 Vasseur .............. H04W 4/70
                                                              706/12
2019/0364483 A1* 11/2019 Gokturk .............. H04W 40/28

FOREIGN PATENT DOCUMENTS

| WO | WO-2009/071692 A1 | 6/2009 |
| WO | WO-2015/052248 A1 | 4/2015 |

OTHER PUBLICATIONS

International Search Report for Application No. PCT/EP2018/053015, dated Oct. 29, 2018.

\* cited by examiner

|   | Neighbour node, y | | | | | |
|---|---|---|---|---|---|---|
| Destination node, d | 1 | 2 | 3 | 4 | ... | N |
| 1 | NULL | $Q_X(2,1)$ | $Q_X(3,1)$ | $Q_X(4,1)$ | ... | $Q_X(N,1)$ |
| 2 | $Q_X(1,2)$ | NULL | $Q_X(3,2)$ | $Q_X(4,2)$ | ... | $Q_X(N,2)$ |
| 3 | $Q_X(1,3)$ | $Q_X(2,3)$ | NULL | $Q_X(4,3)$ | ... | $Q_X(N,3)$ |
| ⋮ | ⋮ | ⋮ | ⋮ | ⋮ | ⋱ | ... | $Q_X(N,\vdots)$ |
| ⋮ | ⋮ | ⋮ | ⋮ | ⋮ | ⋱ | $Q_X(N,\vdots)$ |
| m | $Q_X(1,m)$ | $Q_X(2,m)$ | $Q_X(3,m)$ | $Q_X(4,m)$ | $Q_X(...,m)$ | ⋱ |

| 0 | | | | | | | | | 1 | | | | | | | | | | 2 | | | | | | | | | | 3 | | |
|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| TYPE | | | | | | | | J | R | G | D | U | Reserved | | | | | | | | | | Hop Count | | | | | | | | |
| RREQ ID |||||||||||||||||||||||||||||||||
| Destination IP Address |||||||||||||||||||||||||||||||||
| Destination Sequence Number |||||||||||||||||||||||||||||||||
| Originator IP Address |||||||||||||||||||||||||||||||||
| Originator Sequence Number |||||||||||||||||||||||||||||||||

Fig. 7

| 0 | | | | | | | | | 1 | | | | | | | | | | 2 | | | | | | | | | | 3 | | |
|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| TYPE | | | | | | | | R | A | Reserved | | | | | | | | | Prefix Sz | | | | Hop Count | | | | | | | | |
| Destination IP Address |||||||||||||||||||||||||||||||||
| Destination Sequence Number |||||||||||||||||||||||||||||||||
| Originator IP Address |||||||||||||||||||||||||||||||||
| Lifetime |||||||||||||||||||||||||||||||||

Fig. 8

| 0 | 1 | 2 | 3 | 4 | 5 | 6 | 7 | 8 | 9 | 0 | 1 | 2 | 3 | 4 | 5 |
|---|---|---|---|---|---|---|---|---|---|---|---|---|---|---|---|
| TYPE |||||||| REWARD ||||||||

METHOD OF ADAPTIVE ROUTE SELECTION IN A NODE OF A WIRELESS MESH COMMUNICATION NETWORK CORRESPONDING APPARATUS FOR PERFORMING THE METHOD OF ADAPTIVE ROUTE SELECTION AND CORRESPONDING COMPUTER PROGRAM

In conventional wired networks, a topic of data routing is considered to be a mature research field, where effective and reliable solutions exist, as well as dedicated hardware is placed in the network purely for this specific task (routers). However, due to unique properties of wireless ad hoc networks, such as dynamic topology, wireless transmission medium as well as energy consumption and computational constraints, the task of developing an effective multi-hop routing scheme becomes non-trivial.

Research institutes and the industry faced with such challenges, have developed a large number of routing algorithms for wireless ad hoc networks, which operate with different efficiency in specific networks.

A major class of ad hoc network routing protocols is intended to minimize such main network attributes like control overhead, packet loss ratio, packet delay and energy consumption rate, while maximizing a network throughput [1].

Usually, this class of protocols is divided into three large subclasses, based on their underlying route discovery logics:

Reactive, Also Called On-Demand Protocols:

Those protocols are based on the on-demand strategies, i.e. a route (network path) is created only when the source node requests a data transmission to some destination node in the network. For this purpose, a route discovery procedure must be invoked each time a data entity has to be transmitted. During the route discovery phase, a source node sends a route request message RREQ and waits for route reply messages RREP from its direct neighbors. When the first RREQ message arrives at the destination node, it sends back said RREP message, containing some information about the path. In such way, the route gets established when the source receives back an RREP packet from the destination node, and the data transmission can be triggered. When the data transmission has been finished, the established route becomes inactive after some predefined timeout interval.

Some well-known reactive ad hoc routing protocols are described in [2], and [3].

Proactive or Table-Driven Protocols:

These protocols are based on conventional "table-driven" routing techniques, when the information about the routes from each node to all the possible destinations is gathered on-the fly during the data transmission. In this case, each node has its own routing table containing information about the paths from it to all the other nodes in the network. The global routing information is continuously being updated and exchanged between the nodes by broadcasting control packets to the network. Eventually, all nodes in the network obtain an actual global route table, so that a classical routing algorithm (Bellman-Ford, Dijkstra) from a graph theory can be used by a node to find a path to any possible destination in the network.

The route update mechanism in proactive protocols becomes a challenging problem in the conditions of wireless ad hoc networks due to their specific features, such as power consumption restrictions, dynamic topology, noisy wireless environment. Thus, they are not widely used in ad hoc networks in their initial concept, however, proper modifications of this proactive scheme have been realized described in [4] and [5], such that now they are most commonly used for the routing in ad hoc networks. Also [6] describes a well-known proactive routing protocol.

Hybrid Protocols:

Those protocols use both reactive and proactive techniques, depending on the current transmission environment. Examples of such protocols are described in [7]. These protocols are specified for the use in the WLAN mesh standard IEEE 802.11s.

Another type of routing algorithm is based on Reinforcement Learning which belongs to the field of Machine Learning. The theory of Machine Learning is described in [8, 9]. In general it can be described as the following. There is an "agent" entity, which has some set of "actions" the agent can choose from. Each action is associated with some "estimation value" which tells the agent "how good is this action" if this action will be chosen/triggered. Those estimation values are being dynamically modified during the interaction process, when the agent chooses some action, and receives some "reward" from it. This reward value plays a crucial role, since it directly influences the corresponding estimation value of this action—in general, the lower the estimation value is, the lower the probability of choosing this action will be.

As a general and most frequent example, describing logics behind the Reinforcement Learning, an "N-armed bandit" task is used. The "N-armed bandit" task establishes a goal to retrieve a maximal amount of reward from the N-armed bandit machine used in gambling houses, where "N-arm" means that there is some reasonable number of levers the machine can have (1, 2, 5, 10, etc. number of levers). A player can select one "arm" (lever) from all available ones and pull it, in order to get the winning points/reward. In R. Sutton's "Reinforcement Learning: An Introduction" book [8], a "play" is defined as an event when the player pulls the lever, and the outcome of this event is defined as "reward". So, the task is to maximize the expected total reward over some number of plays, in other words the action selections.

As a maximization parameter, an "estimation value Q" is used, which, in general, can be calculated as:

$$Q_{k+1,a} = \alpha * [r_{k+1,a} - Q_{k,a}] \qquad (1)$$

where:

$Q_{k+1,\ a}$ is the expected reward value for the action a;

$Q_{k,\ a}$ is the estimated reward value of the action a on the last event;

$r_{k+1,\ a}$ is the actual reward value obtained for the action a;

$\alpha$ is a step size parameter;

k is the current step number.

Figure 1:
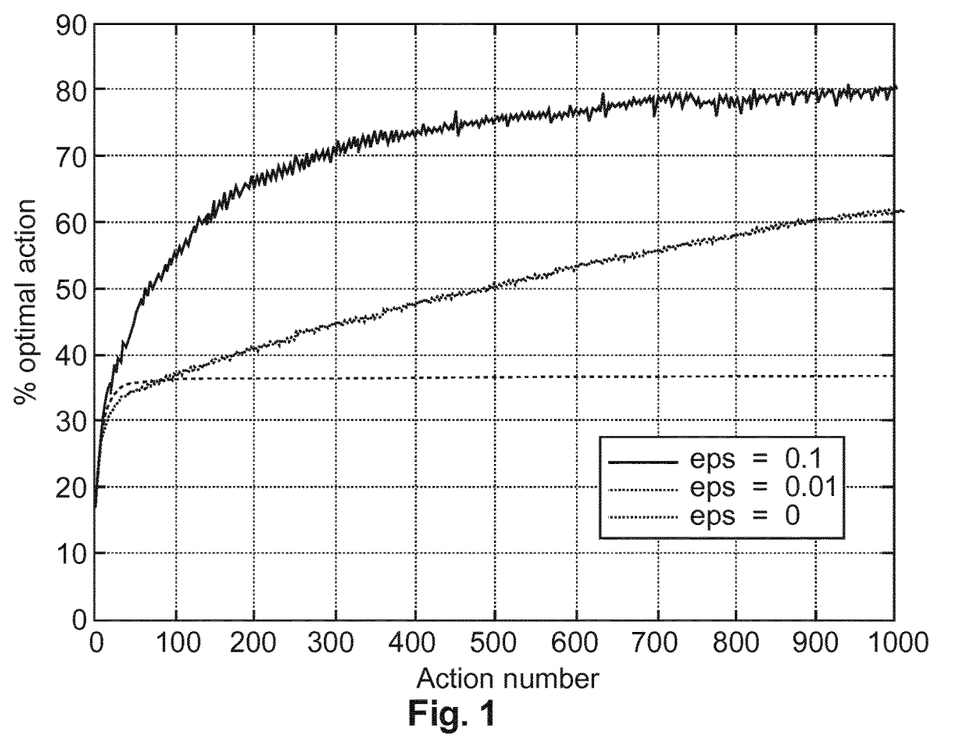
FIG. 1 shows an illustration of the average performance of a e-Greedy action selection method in a 10-armed bandit play simulation for different e-Greedy parameters.

There are many "selection methods", based on which, the action decision is made. It can be a simple "Greedy" method, which always selects an action a with the maximal estimation value $Q_{k+1,a}$. FIG. 1 shows distributions of the optimal selection ratio when an e-Greedy selection method is used. The three curves correspond to a variation of the e-Greedy parameter eps between 0, 0.01 and 0.1 as indicated in the drawing. Such curves simulate results of the e-Greedy selection method over 1000 plays for a 10-arm bandit model, averaged over 2000 tasks.

Wireless mesh networks may be used in particular in situations where the network nodes are moveable or portable and a great flexibility is required in configuring the network. One form of wireless mesh networks are wireless mobile ad hoc networks. These are self-configuring, dynamic networks in which nodes are free to move. Wireless ad hoc networks lack the complexities of infrastructure setup and administration, enabling devices to create and join networks "on the fly"—anywhere, anytime.

One example where the wireless mesh network technology may be used, despite of the fact that the participants are not moveable, is the field of intelligent street lighting. In intelligent street lighting, also referred to as adaptive street lighting, the street lights are dimmed when no activity is detected, but brightened when movement is detected. Such an intelligent street light is equipped with a camera or sensor for object recognition and processing and communication means. When a passer-by is detected, it will communicate this to neighboring street lights, which will brighten so that people are always surrounded by a safe circle of light on their way. A detailed description of such concept is presented in DE 10 2010 049 121 B8.

The inventors identified different problems with these approaches described above. One problem relates to the problem of initializing the route table which is set up in a node for making a next hop decision when routing packets towards it destination.

One challenge with these approaches is that in cases where similar reward values are returned back in a path discovery phase there is a relatively high likelihood that a path is selected which is relatively inefficient.

There is therefore a need for an improved approach for setting up a route table in a path discovery phase. This corresponds to the problem of the invention.

This object is achieved by a method of adaptive route selection in a node of a wireless mesh communication network according to claim 1, a corresponding apparatus for performing the method of adaptive route selection according to claim 14, and a corresponding computer program according to claim 15. The dependent claims include advantageous further developments and improvements of the invention as described below.

The proposal concerns an improvement in a method of adaptive route selection in a node of a wireless mesh communication network, wherein the RL-based routing technique is used. The proposal concerns an improvement in the path discovery procedure which is used for setting up route tables to reflect the current state of the network. In the path discovery procedure a route request message (RREQ) is broadcast by the source node. A neighboring node receiving such RREQ message will re-broadcast this message further into the network. This happens on and on in a number of hops until the RREQ-message ultimately is received by the addressed destination node. When this happens the destination node broadcasts a route reply message (RREP) in response to the reception of said RREQ-message which is likewise re-broadcast in a number of hops by the intermediate nodes receiving the route RREP-message. In this process a node which has received said RREQ-message, updates a route table with corresponding estimated reward values, for the corresponding action. The same happens at a node receiving the RREP-message. A specific reward function is proposed for estimating said reward values in the path discovery procedure. The proposal includes that the reward function is dependent on a receiving signal strength indicator RSSI measured during reception of said route request message or route reply message and the number of hops the route request message or the route reply message has propagated in the network to reach the receiving node. This proposal has the advantage that shorter routes with a strong reception signal are prioritized in the initial stage.

In one advantageous embodiment the reward function is defined in the form:

$$\begin{cases} \text{reward} = f(RSSI, N_{hops}) = \dfrac{RSSI_{min}}{RSSI * N_{hops}}, & \text{if } RSSI \neq 0 \\ \text{reward} = f(RSSI, N_{hops}) = \dfrac{|RSSI_{min}|}{N_{hops}}, & \text{if } RSSI = 0 \end{cases}$$

where reward is the resulting estimated reward value for the action to send a message to the next neighbor from which the route request message or the route response message has been received, and $RSSI_{min}$ is the minimum possible value of the receiving signal strength indicator RSSI, which can be measured by the wireless network interface.

Herein, in a further embodiment of the invention $RSSI_{min}$ is measured in dBm values varying in the range of [−100, 0], where Zero corresponds to the strongest received signal.

In an enhanced embodiment of the proposal the RL-based routing is also applied for normal packet routing absent the path discovery phase. Here, a feedback reward function is used for estimating reward values, wherein said feedback reward function is defined in the form of:

$$\begin{cases} \text{reward} = \dfrac{Q_{avg}}{|RSSI|}, & \text{if } RSSI \neq 0 \\ \text{reward} = Q_{avg} * m, & \text{if } RSSI = 0 \end{cases}$$

where m is a multiplication coefficient, which increases the reward value, when the receiving signal strength indicator RSSI achieves the maximum value Zero, wherein the multiplication coefficient is in the range: [1, 100];

where $Q_{avg}$ is the calculated average estimated reward value, which is received at the sending node in a feedback message (ACK) for a transmission from the sending node.

Moreover it is proposed, to calculate the average estimated reward value $Q_{avg}$ according to the formula:

$$Q_{avg} = \dfrac{\sum Q_{DST\ IP}}{N_{values}}$$

where $Q_{DST\ IP}$ is the estimated reward value for a transmission from the sending node in the direction of the destination node, where $N_{values}$ is the number of values from which the average is to be calculated. Both proposals result in a substantially better route recovery time behavior compared to traditional routing schemes.

It is a further advantageous measure that a node takes a next-hop decision at a step number t based on a probability distribution function $P_t(a)$, where $P_t(a)$ corresponds to the selection probability of choosing action a at the step number t.

In this proposed variant it is advantageous if the probability distribution function $P_t(a)$, corresponds to a Gibbs-Boltzmann distribution function according to the formula:

$$P_t(a) = \dfrac{e^{\frac{Q_t(a)}{\tau}}}{\sum_{i=1}^{n} \dfrac{Q_t(b)}{\tau}}$$

with $Q_t(a)$ being the estimated reward value of action a at the current step t with $Q_t(b)$ being the estimated reward value of alternative action b at the current step t and τ being a positive temperature parameter for the Gibbs-Boltzmann distribution, and i being an index value. High values of the temperature parameter τ make the selections of the actions to be evenly probable, i.e. the selection probabilities of all possible actions will be equal or very close to each other. On the other hand, low temperatures cause greater differences in selection probabilities between the actions. This way a control parameter τ is defined which may be used to adjust the routing behavior.

In one further embodiment it is proposed that the temperature parameter is adaptively defined in dependence of the current packet loss rate PLR. High values of the temperature parameter τ make the selections of the actions to be evenly probable, i.e. the selection probabilities of all possible actions will be equal or very close to each other. On the other hand, low temperatures cause greater difference in selection probabilities between the actions.

Here, it is advantageous that the temperature parameter τ is adaptively defined according to the formula:

$$\begin{cases} \tau(PLR) = t_0, & \text{if } PLR \le 1 \\ \tau(PLR) = t_0 * k * (PLR - 1) + t_0, & \text{if } PLR > 1 \end{cases}$$

where k is a growth coefficient equaling 0.5 by default and varying in the range [0, 1]; and $t_0$ is an initial value of the temperature parameter taken from the range [0, 1000].

Also it is advantageous if the current packet loss rate PLR is calculated according to the formula $$PLR = \frac{N_{lost\ packets}}{N_{total\ sent\ packets}} * 100$$

where $N_{lost\ packets}$ is the current number of lost packets and the number of total sent packets $N_{total\ sent\ packets}$ is in the range of [0, 100]. With the ongoing process of neighbor selections and subsequent packet forwarding, the PLR value may vary in an unpredicted manner, thus affecting the reliability of the established routes. In such scenarios, it is advantageous to modify the temperature parameter τ according to the formula above.

Another proposed improvement bringing an advantage in RL-based routing is the measure that in the case that a packet is lost the sending node generates a negative reward value and uses it in the process to update its route table in order to mark the selected route as less attractive for further transmissions.

Here, it is advantageous to introduce an exponential increase in the negative reward value calculation when successive packet losses occur.

The exponential increase of the negative reward value may be calculated according to the formula:

$$reward_{negative} = f(n) = -1 * e^{\frac{n-1}{2}},$$
$$n \ge 2$$

where n corresponds to the number of subsequent packet loss events, wherein for n=1 the negative reward value is set to −1. This leads to a significant advantage in the observed Packet Loss Ratio values, compared to a traditional routing scheme.

The invention also concerns a correspondingly adapted apparatus to perform the method of adaptive route selection.

The invention also concerns a corresponding adapted computer program with instructions which perform the method for route selection when run in a computing system.

In the following, the invention will be described by means of advantageous embodiments with reference to figures of a number of drawings. Herein.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

Figure 2:
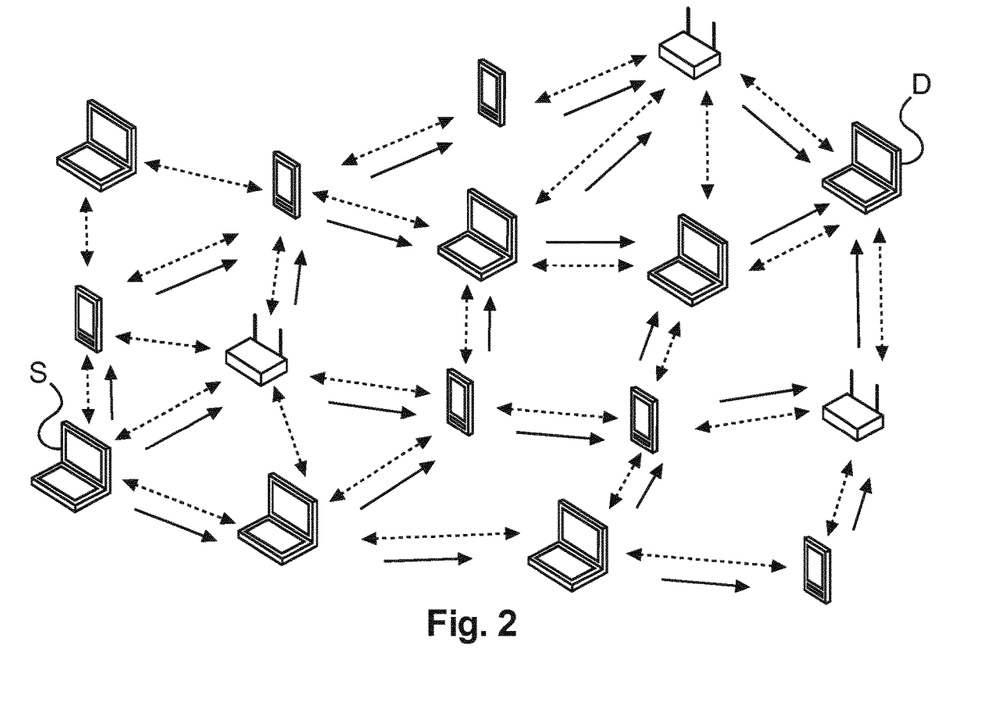
FIG. 2 shows an example of a wireless mesh network set up with portable devices.

An example of a wireless ad hoc network is depicted in FIG. 2. This drawing shows a plurality of portable devices such as laptops, or tablet computers and smart phones and routers. The direct links between these devices are depicted with dotted lines. One source station at the left side is labelled with a reference sign S. One destination station at the right side is labelled with a reference sign D. A data packet sent by the source node S needs to be routed through the network towards the destination node D. Possible network paths with 5 hops the packet could be routed along are indicated by arrows. It is considered that all participants in the communication network depicted in FIG. 1 are equipped with a WLAN interface according to one of the IEEE 802.11xx standards family, e.g. the IEEE 802.11s standard.

Figure 3:
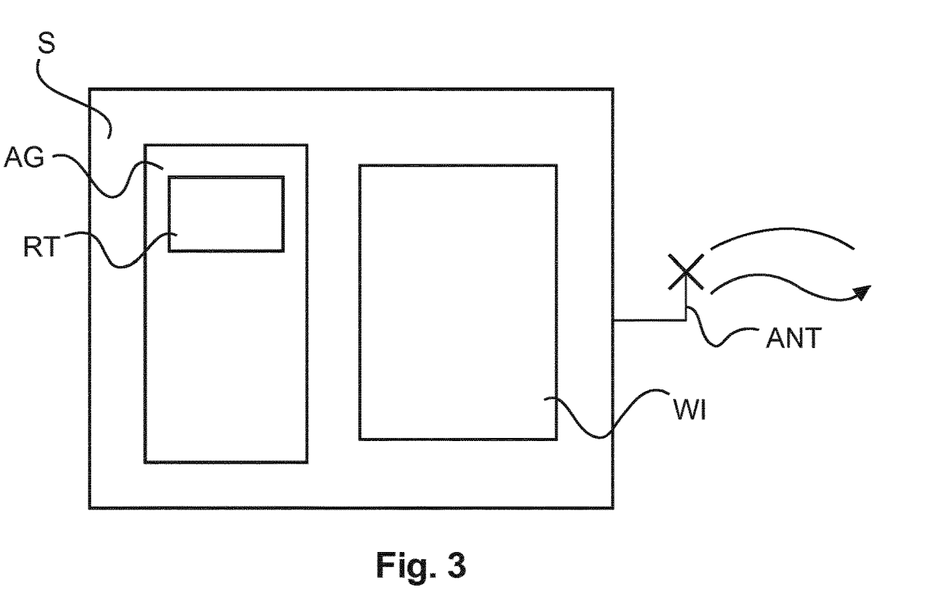
FIG. 3 shows a simplified block diagram of a node.

According to the proposal the reinforcement learning-based routing technology is used. The main logic of the reinforcement learning concept consists in the fact that there is an action which is being chosen from a set of actions and that there is a feedback in the form of a reward on the chosen action, which modifies some selection criteria (an estimation value) for this action in the future. In FIG. 3 the concept of reinforcement learning is illustrated in the form of a block diagram of a wireless network node. It could be any network node but the one shown corresponds to a source node S. In there, there is an agent AG who decides which path a packet from a source node S to a destination D should be sent on further. To be able to decide this the agent AG updates a routing table RT in which for each link to a direct neighbor of this node it is recorded the estimation value Q representing the success ratio a packet when routed into this direction reaches the destination node D. For each packet the agent AG takes the routing decision leading to the transmission of the packet via WLAN circuitry WI and the antenna ANT, the agent AG awaits receiving back an acknowledge packet ACK in which a reward value is returned from the neighbor, who received that packet. The agent AG upon receiving back the acknowledge packet or detecting loss of such a packet updates its routing table RT. All these tasks of the agent will now be explained in greater detail. The agent could be implemented in the form of an application program which is installed in memory of the network node and run on a processor of the network node.

First, the overall reinforcement learning concept (RL) is aligned with an adaptive packet forwarding algorithm in the following way:

for each destination address a packet should be delivered to:
   in each node there is an agent as in the RL concept
   the direct neighbors of the node correspond to the set of actions a the agent can take
   the route table RT corresponds to a set of estimation values Q
   when a node sends a packet to the selected neighbor it corresponds to an action being selected and triggered
   a received ACK message in response to a sent data packet from the chosen neighbor corresponds to the received reward value.

Figure 4:
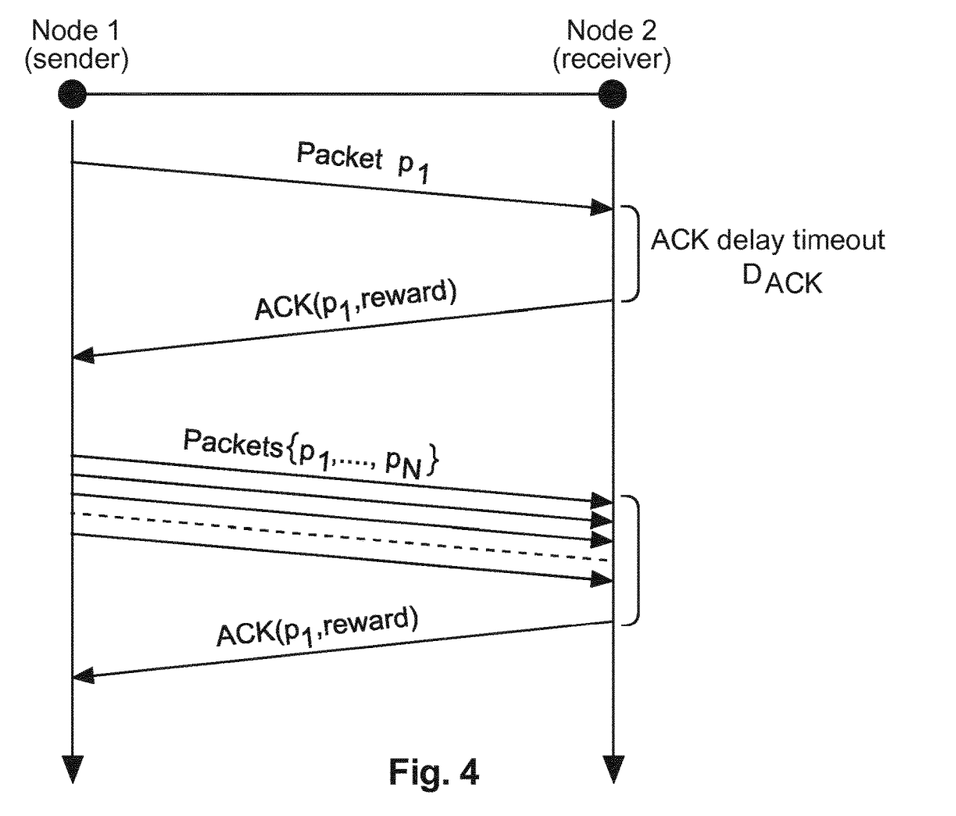
FIG. 4 shows the generic scheme of packet forwarding and receiving feedback information in an ACK message.

When a node, with a packet to a destination address, selects a "next hop node" from the list of its direct neighbors and sends the packet there, it then waits for an acknowledgement message ACK from this neighbor, which contains some reward value for choosing this neighbor. This process of sending out a packet $p_1$ and receiving back an acknowledgement packet ACK($p_1$, reward) is illustrated in FIG. 4. Further packets $p_2$ to $p_N$, may be sent and further acknowledgement packets awaited. There is an ACK delay timeout period which is needed in the receiving node for processing until the ACK packet can be transmitted back. Such processing incudes a reward value calculation which is returned back in the ACK packet.

There are three possible outcomes which can happen during the transmission phase:
   the data packet or the ACK packet is lost during the transmission:
   In this case, the sending node will not receive the ACK packet, so it will automatically assign some negative reward value for the chosen action. This is reasonable, because if the packet or the ACK packet are being constantly lost while being sent to the particular neighbor, this means that either the node has gone offline, or the node has gone out of the transmission range while moving, or the wireless link has become too unreliable (due to various reasons related to wireless transmission problems), or the node is too overloaded with incoming traffic.

In any case, it makes sense to lower the probability of choosing this particular neighbor for transmitting data packets with the given destination address. This is done by assigning a negative reward value for calculating the updated estimated Q value entry in the route table.
   the ACK is received with low reward value:

This means, that the neighbor which has received the data packet, does have a path to the destination, but this path is either not optimal in length (too many hops), or the further links quality is bad. So, the node will slowly decrease the estimation value Q for this particular choice in the long run, raising the probabilities of choosing the other neighbors.

the ACK is received with high reward value:

If the received ACK packet contains high reward value, it means that this neighbor has a good path to the destination node, so it might be preferred as a good forwarding decision. While sending the packets to such neighbor and getting back the ACK packets with high reward values, the overall estimation value Q of this neighbor will increase in the long run, therefore, the probability of choosing this action will increase, providing a good data routing on this link.

Figure 5:
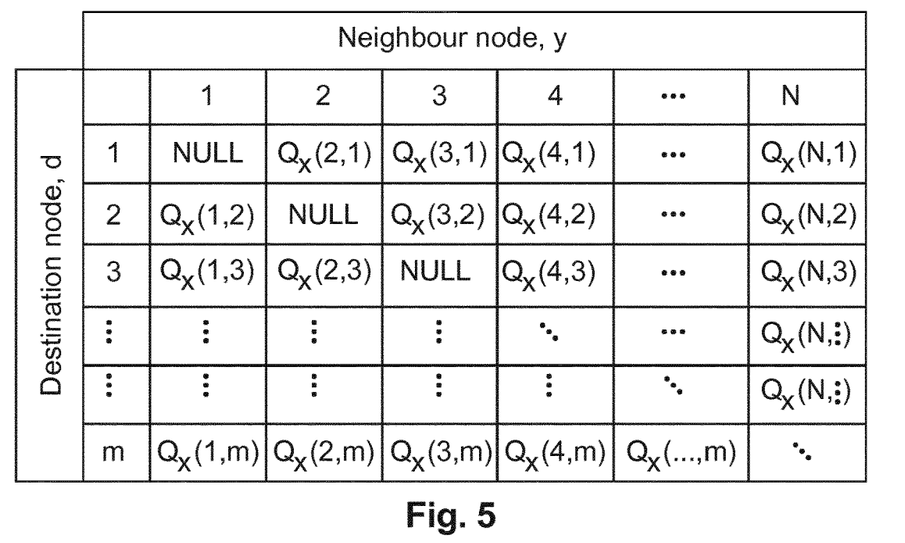
FIG. 5 shows the principle structure of a route table with estimated Q values for the actions of packet forwarding to the direct neighbors.

An example of a route table RT with the constantly updated estimated Q values is illustrated in FIG. 5

Figure 6:
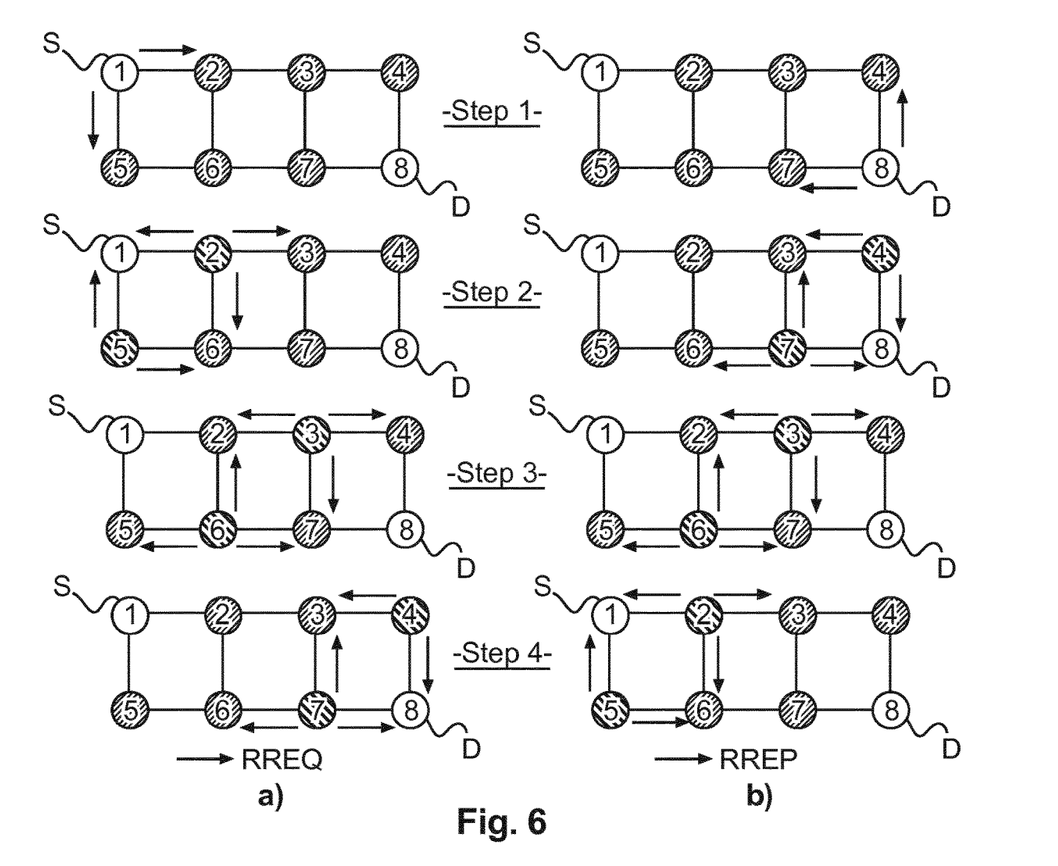
FIG. 6 shows the steps of RREQ message broadcasting from source node to destination node in a number of hops in a) and the steps of RREP message broadcasting from destination node to source node in a number of hops in b)
Figure 7:
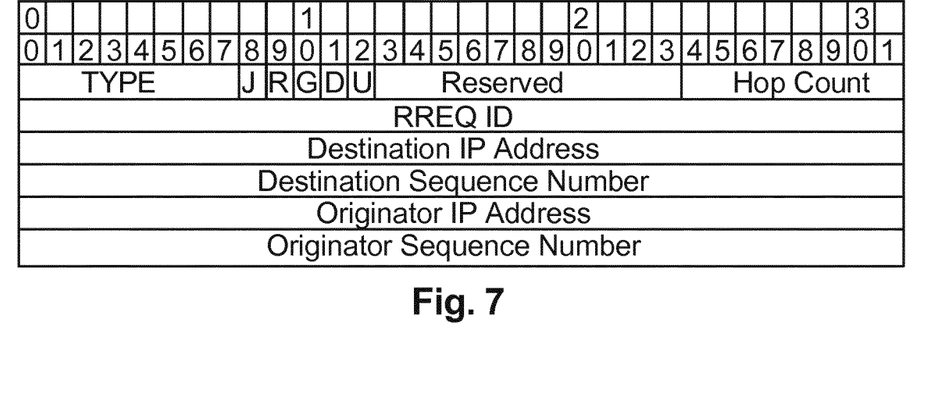
FIG. 7 shows the format of the payload field in an RREQ message.

Next it will be explained how the RL-based routing process will be initialized. The initial distribution of reward values for the paths throughout the network takes place in a phase of route discovery, illustrated in FIG. 6. The node broadcasts a route request message RREQ to its direct neighbors, and the neighbors re-broadcast this RREQ further into the network. This process is illustrated in FIG. 6a. This broadcast technique is often called "flooding" in the state-of-the-art, since the RREQ-message is basically being forwarded to every node in a network, until either the broadcast time-to-live counter TTL is reached, or a duplicate RREQ message is received by a node which has already sent this RREQ message previously. The format of an RREQ message is shown in FIG. 7. It is noted that the payload field of the RREQ message is shown, only. In such a way, every node in the network updates its own routing table RT with an actual information about the route towards the RREQ-message's source address (to the address of the originating node in FIG. 7).

Figure 8:
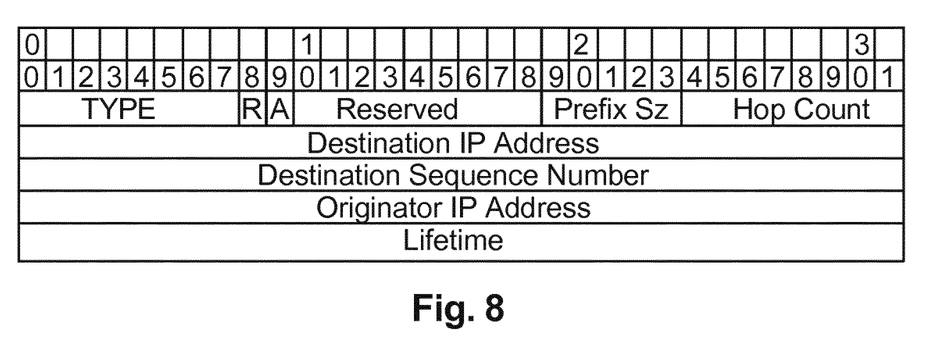
FIG. 8 shows the format of the payload field in an RREP message.
Figure 9:
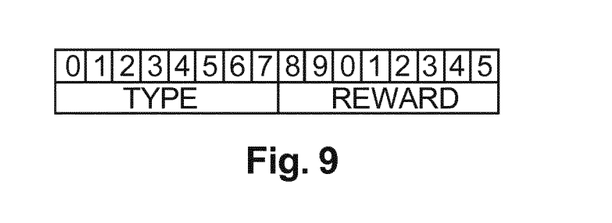
FIG. 9 shows the format of the payload field in an ACK message.

The returning back of the route reply messages RREPs starts once the destination node D has received an RREQ-message. The forwarding of the RREP-message happens in a similar way but in the opposite direction. The forward process of the RREP-messages is illustrated in FIG. 6b. The format of an RREP-message is shown in FIG. 8. In addition, the format of an ACK message is shown in FIG. 9. It is noted that the first byte in the payload field of the ACK message contains the ACK type. The second byte contains the reward value.

On a zero-stage, when a source node S has no route information towards a destination node D, its estimation values for transmissions towards the destination address are set to an initial value $Q_0=0$ by default. In another embodiment the available range of estimated reward values for initialization is defined as: $[Q_0, |RSSI_{min}|]$, where:

$RSSI_{min}$ is the minimum possible value of the receiving signal strength indicator, the agent can receive from the physical network interface, upon reception of the corresponding RREQ/RREP message. The RSSI entry can be read with a corresponding command in the driver software of a wireless network adapter, the value represents the signal strength in dBm.

After this first initialization step, the "path discovery" procedure is triggered where RREQ messages broadcasts are broadcast and RREP messages are returned back also in broadcast communication mode. While the messages are being propagated through the network, each node which has received an RREQ-message with source node S address and destination node D address, see FIG. 5a, updates the route table with the estimated reward value calculated in the receiving node, according to the following reward function:

$$\begin{cases} \text{reward} = f(RSSI, N_{hops}) = \dfrac{RSSI_{min}}{RSSI * N_{hops}}, & \text{if } RSSI \neq 0 \\ \text{reward} = f(RSSI, N_{hops}) = \dfrac{|RSSI_{min}|}{N_{hops}}, & \text{if } RSSI = 0 \end{cases} \quad (2)$$

where:

reward is the estimated reward value for a transmission action towards a neighbor which is reached in a number of hops $N_{hops}$, RSSI is the Received Signal Strength Indicator in dBm, varying in ranges [−100, 0], where 0 corresponds to the strongest received signal;

$N_{hops}$ is the number of hops a RREQ message has traversed from the source and destination node, respectively.

The same happens when a RREP message is being received in a node. At the end of this process the route table RT is fully initialized, i.e. each node has for all its direct neighbors an entry in the route table about an estimated Q value reflecting the outcome from the path discovery phase.

Figure 10:
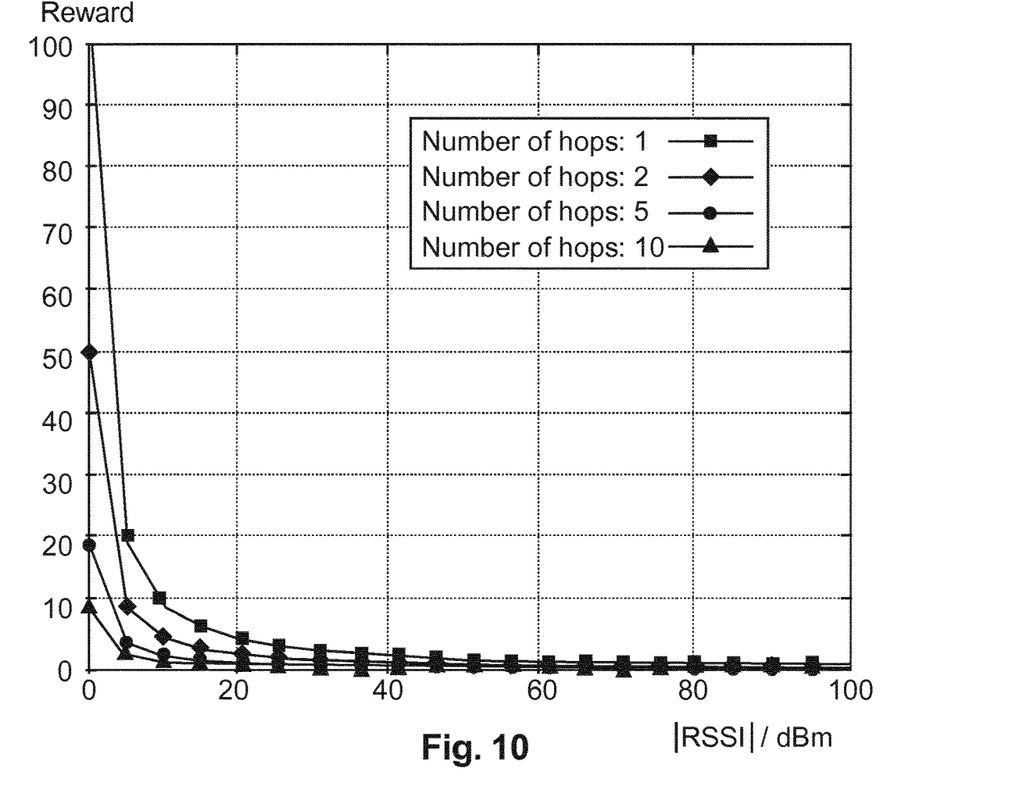
FIG. 10 shows an example of the variation in estimated reward values depending on the RSSI value for different some cases with a different number of hops.

FIG. 10 shows a dependency between the calculated reward value and RSSI, with the number of hops [1, 2, 5, 10]. The minimum RSSI value $RSSI_{min}$ corresponds to −100 dBm.

Thus, when the path discovery procedure ends, all the nodes, including the source and the destination, have obtained the estimated reward values towards the destination address as well as towards the source address. Considering the formula above, the estimation values are distributed based on the hop count value from the source/destination, as well as the RSSI indicator. In that way, shorter routes with strong receive signal values are prioritized in the initial stage.

A mechanism of reward generation plays an important role in the overall packet forwarding procedure, since it defines a degree of "flexibility" in the packet forwarding decisions. For example, if the reward values do not greatly vary between "good" and "bad" routes, the nodes will simply not use more optimal paths most of the time, instead, there is a high probability, that the packets will go in the most inefficient way, causing more packet losses and delays. In the same way, if a reward with a very small negative value will be generated after failing to receive the ACK message, the corresponding entry will decrease the estimation value for this route too slowly, so the succeeding packets will likely to be sent and lost along the same route with higher probability.

In order to solve this problem, the following behavior is proposed: When a node receives a packet from a sending node, it calculates its average estimation value towards the destination address of the received packet and sends it back in an ACK message. The receiving node gets the average value, and divides it by the absolute RSSI value of the received message. Thus, the following feedback reward function is proposed:

$$\begin{cases} \text{reward} = \dfrac{Q_{avg}}{|RSSI|}, & \text{if } RSSI \neq 0 \\ \text{reward} = Q_{avg} * m, & \text{if } RSSI = 0 \end{cases} \quad (3)$$

where:

RSSI is the receiving signal strength indicator in dBm, varying in a range of [−100, 0], where 0 corresponds to the strongest received signal;

m is the multiplication coefficient, which increases the reward when the receiving signal strength achieves the maximum value (RSSI=0), and varies in the range of: [1, 100];

where $$Q_{avg} = \frac{\sum Q_{DSTIP}}{N_{values}}$$

is the calculated average estimated reward value for observed transmissions in the direction of the destination IP address, which is being sent back to the sender in the ACK message.

This formula corresponds to the particular case of the initial Q values estimation, with the number of hops equal to 1, see formula (2). After receiving the ACK message, the sender node gets a general information about "how good is this neighbor for such destination", or "how good are the routes of this neighbor" towards the destination address. If the average estimation value is high, it means, that this neighbor is located closely to the destination, or it has many other good opportunities for forwarding the packet further. In contrast, if the average value is low, then either the neighbor is located farther from the destination, or it has too few forwarding opportunities for the given destination. In any case, the node, after receiving the ACK, updates its own route entry towards this neighbor with either a high or low reward value.

Figure 11:
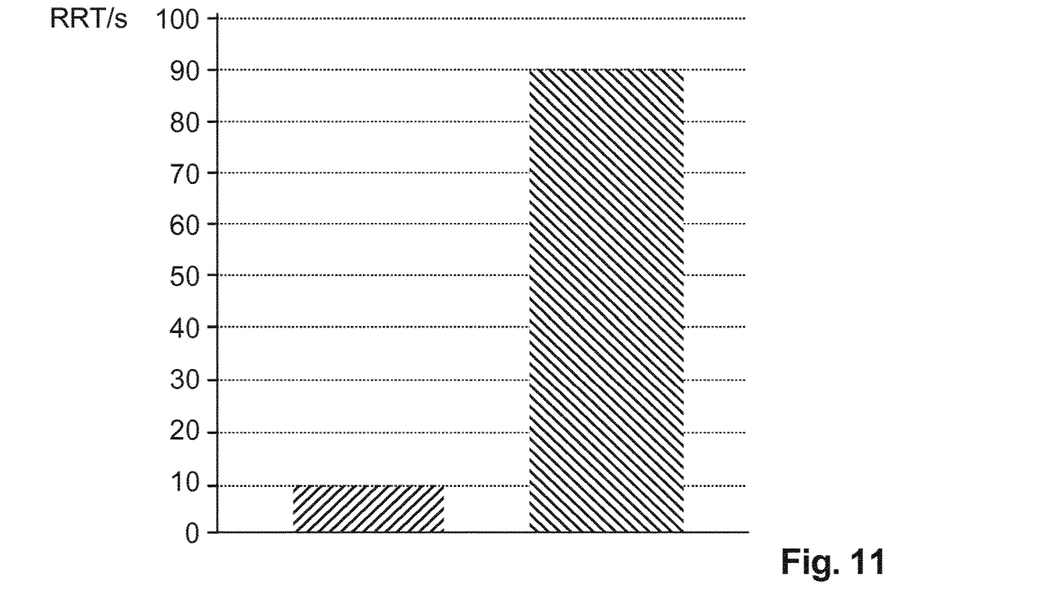
FIG. 11 shows the improvement in the resulting route recovery time values RRT compared with a traditional routing scheme.

FIG. 11 shows a better RRT (Route Recovery Time) value on the left side compared with a traditional routing scheme on the right side.

A further improvement concerns the next-hop selection method where it is proposed to base this decision on a Gibbs-Boltzmann probability distribution function, which has the following formula:

$$P_t(a) = \frac{e^{\frac{Q_t(a)}{\tau}}}{\sum_{i=1}^{n} \frac{Q_t(b)}{\tau}} \quad (4)$$

where:

$P_t(a)$ corresponds to the probability of choosing action a at the step number t;

$Q_t(a)$ corresponds to the estimated reward value of action a at the current step t;

$Q_t(b)$ corresponds to the estimated reward value of the alternative action b at the current step t; and $\tau$ corresponds to a positive parameter in the Gibbs-Boltzmann probability function called temperature.

High values of the temperature parameter $\tau$ make the selections of the actions to be evenly probable, i.e. the selection probabilities of all possible actions will be equal or very close to each other. On the other hand, low temperatures cause greater differences in selection probabilities between the actions.

If $\tau \rightarrow \infty$, the method turns into a classical Greedy selection method.

The selection probabilities are proposed to be adaptively defined from the current Packet Loss Rate (PLR) value, by changing the temperature parameter $\tau$ in the following way:

$$\begin{cases} \tau(PLR) = t_0, & \text{if } PLR \leq 1 \\ \tau(PLR) = t_0 * k * (PLR - 1) + t_0, & \text{if } PLR > 1 \end{cases} \quad (5)$$

where:

PLR corresponds to the Packet Loss Ratio, with the values in the range [0, 100]. The PLR value is calculated by the formula:

$$PLR = \frac{N_{lost\ packets}}{N_{total\ sent\ packets}} * 100$$

r corresponds to the temperature parameter from Gibbs-Boltzmann distribution;

k corresponds to a proposed growth coefficient, equaling 0.5 by default, and varying in the range: [0, 1];

$t_0$ corresponds to an initial value of the r-parameter, which varies in the range: [0, 1000].

Figure 12:
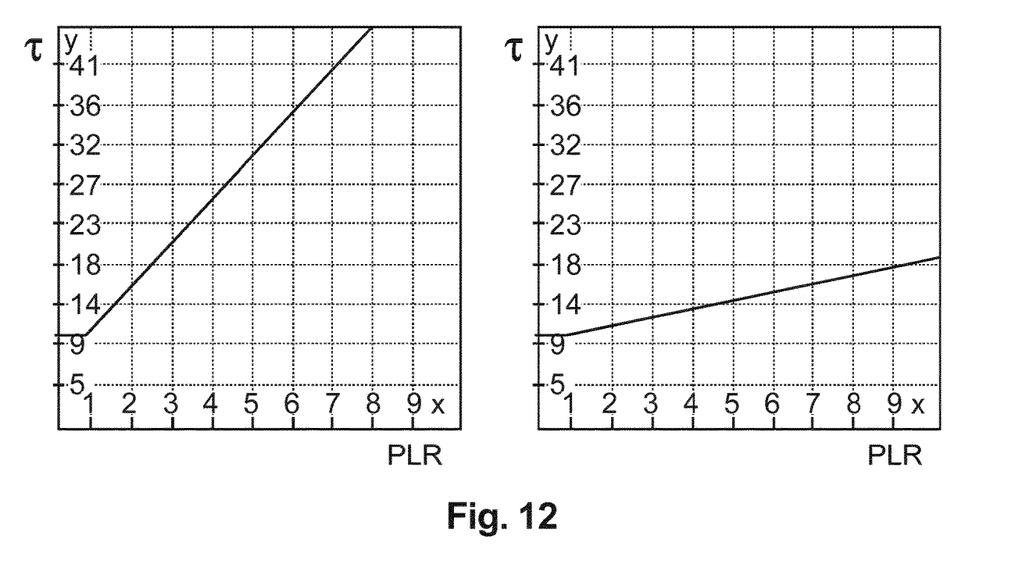
FIG. 12 shows examples of the proposed temperature function for the Gibbs-Boltzmann distribution with a growth coefficient k equal to 0.5 on the left side and k equal to 0.1 on the right side.

An example of the $\tau(x)$ function is depicted in FIG. 12, where x corresponds to the PLR value. On the left the $\tau(x)$ function is shown for the k value of 0.5 and on the right side for the k value of 0.1.

Thus, the proposed $\tau(x)$ function defines the form of weights (probabilities) distribution of selecting the given action, depending on current PLR values which is the aim of this proposal. An example is provided hereinafter.

Figure 13:
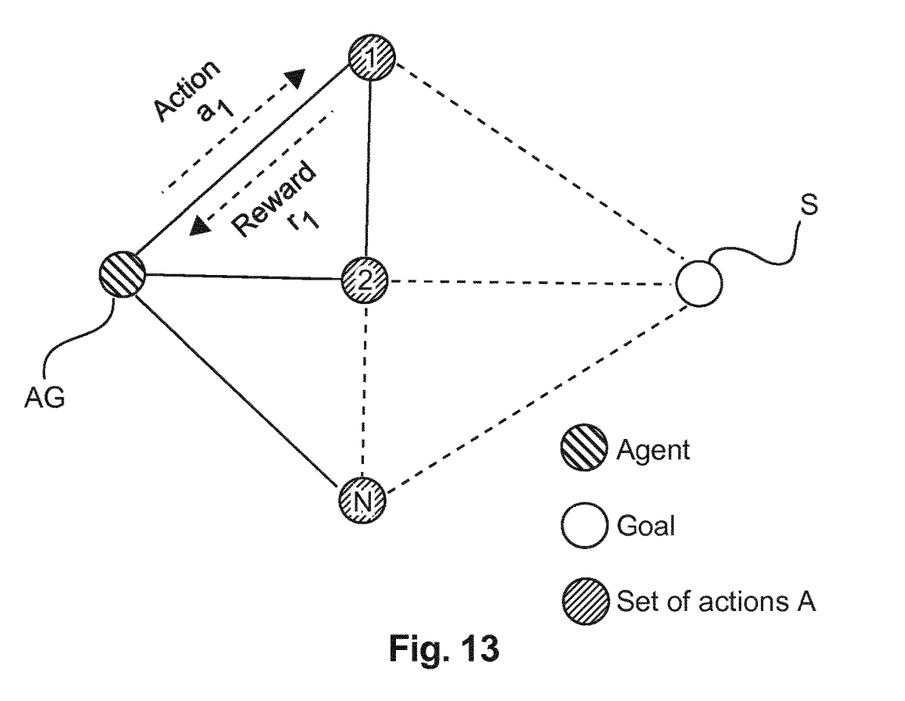
FIG. 13 illustrates the general task of packet forwarding in a multi-hop network when applying the routing process based on a reinforcement learning approach.

FIG. 13 shows a wireless mesh network with a number of participants. The figure shows the general task of RL-based routing where the current node who's turn it is to forward an incoming packet is labelled with reference sign A. It is assumed that node A has 5 direct neighbors, i.e. N=5 and has to forward an incoming packet towards the given destination node D which in the illustrated example is two hops away. The direct links are illustrated with bold lines and the indirect links in the perspective of node A are illustrated with dotted lines.

After the path discovery stage, when initial weights towards the source and destination nodes are established, using the algorithm and formulas as explained above, the source node has a list of estimated reward values to all direct neighbors towards the destination—Q(n). In the given example with 5 direct neighbors, the list size is equal to 5.

Assume, that after the initialization, the list of weights contains the following, here presented in the Python computer language dictionary format:

$Q(n)=\{n1:50.0,n2:33.3,n3:11.1,n4:44.0,n5:51.0\}$

Using the mentioned Gibbs-Boltzmann distribution, the action selection probabilities—$P_t(a)$ for all actions at the step 0 will be calculated with a temperature parameter $\tau(x)$ equal to 10 (assuming that the initial PLR value is 0). In that case we get the following results for the selection probabilities:

$P(a)=\{n1:0.35,n2:0.07,n3:0.01,n4:0.2,n5:0.37\}$

Thus, the neighbor 5 will be selected most of the time—with 37% of selection probability at the initial step 0.

With the ongoing process of neighbor selections and subsequent packet forwarding, the PLR value may vary in an unpredicted pattern, thus, affecting the reliability of the established routes.

In such scenarios, the temperature τ parameter is modified according to the formula above.

E.g., during the packet forwarding, at the step t, the estimated PLR value has changed from 0 to 20 percent. Accordingly, the new τ parameter has the new value of:

τ=τ(PLR)=10*0.5*(20−1)+10=105

The new selection probabilities list $P_t(a)$ resulting at the step t give:

$P_t(a)$={n1:0.22,n2:0.19,n3:0.15,n4:0.21,n5:0.22}

As seen, at the new step t, the selection probabilities of neighbors 1 and 5 have decreased, while the chances of selecting the neighbors 2 and 3 have increased significantly. This modification of selection probabilities implies a selection of previously less-attractive routes, since the overall channel reliability had decreased drastically (from 0 to 20%). This shows, that a much more flexible route selection process is resulting under unreliable communication conditions, making sure that the alternative routes are explored more frequently.

Figure 14:
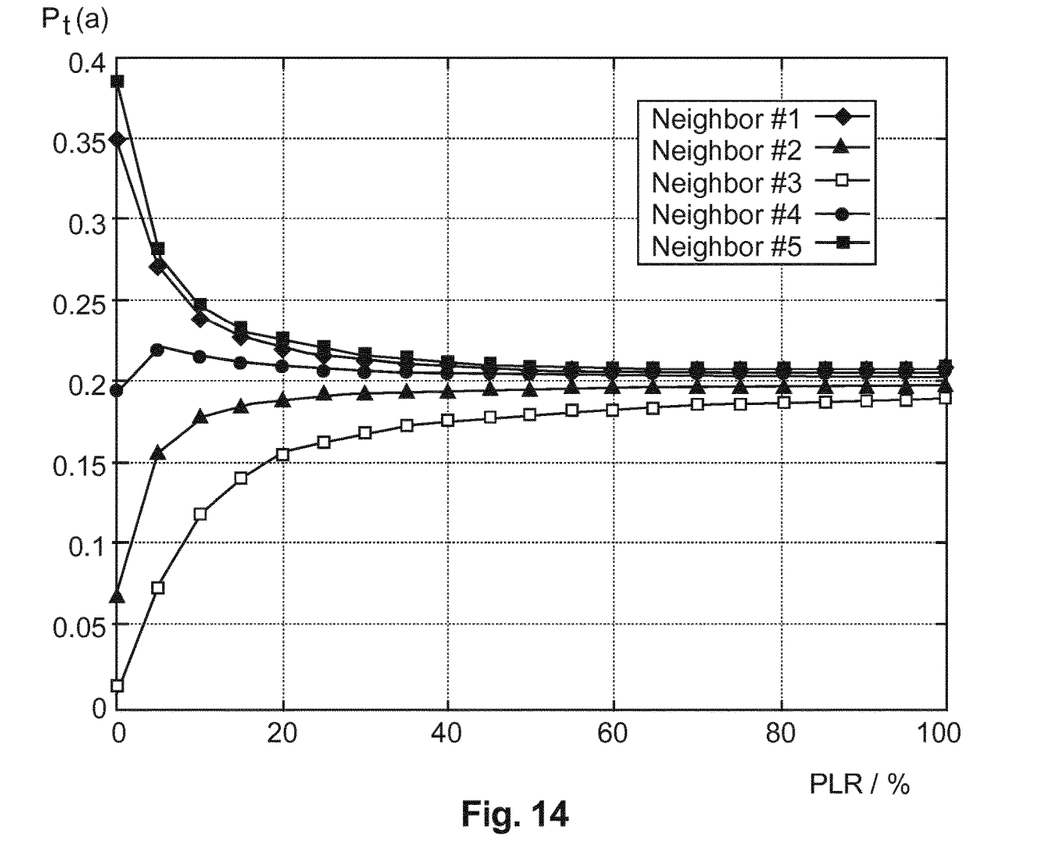
FIG. 14 shows an example of the variation in neighbor selection probabilities $P_t(a)$ depending on the packet loss ratio value PLR.

FIG. 14 illustrates the dependency between the neighbor selection probability and the PLR value under the constraints of the given example, with the initial estimated reward values equal to Q(n) as listed above. It is very evident, that there is a substantial difference in selection probability for the 5 neighbors when the PLR value is in the range of 0 to 20%.

In order to quickly determine changes in routes, the classical routing protocols use so-called Route Error service messages RERR, which are broadcast in the same way as the RREP-messages in the case of a route error detection. This behavior increases the number of service messages in the network drastically, thereby decreasing an overall performance of the network.

During the process of neighbor selection and packet forwarding, the sender node waits for an incoming ACK message, containing the calculated reward value for choosing this neighbor. However, due to given communication conditions in wireless multi-hop networks with unstable links and high probabilities of interferences, signal losses, nodes mobility and so on, the sent packets could easily be lost. As explained above, in that case, a sender node generates a negative reward in order to mark the selected route as less attractive for further transmissions.

Within the given RL-based routing algorithm, an exponential increase of negative reward value is proposed. This exponential function allows a sender node to adapt significantly faster to the events of subsequent packet losses, therefore, increasing the chances to quickly find an alternative route. Thus, a Route Recovery Time decreases significantly, which is crucial for effective communication in wireless multi-hop networks.

The proposed exponential function for negative reward generation is the following:

$$reward_{negative} = f(n) = -1 * e^{\frac{n-1}{2}}, n \geq 2 \qquad (6)$$

n—number of subsequent packet loss events (i.e, when the receive timeout on the sender side has been reached).

Figure 15:
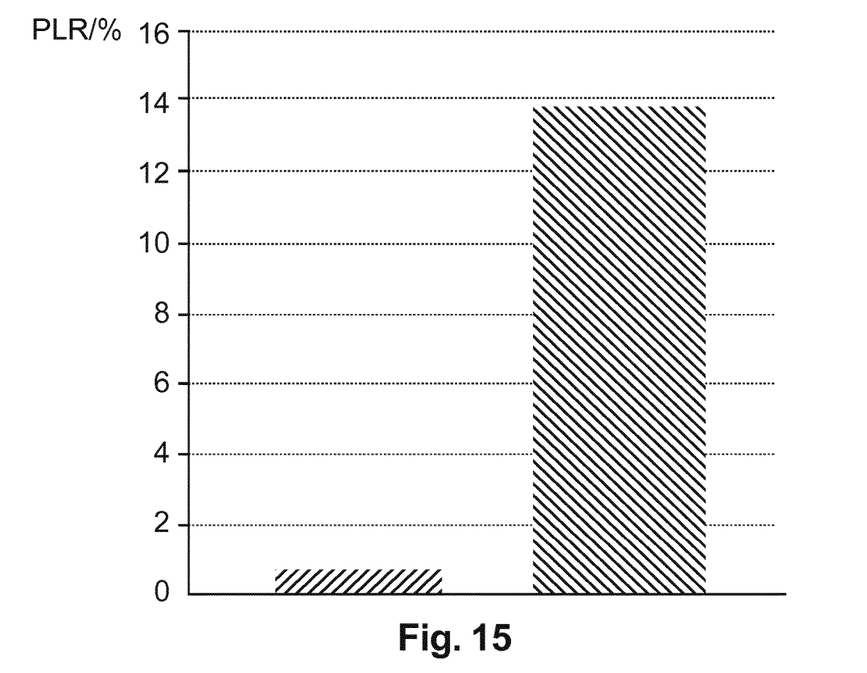
FIG. 15 shows the improvement in the resulting packet loss ratio when using the proposed RL-based routing algorithm compared with a traditional routing scheme.

FIG. 15 shows a significant advantage in the Packet Loss Rate (PLR) value provided in percent, comparing to a traditional routing scheme.

The proposed improvement of the negative reward value generation is also presented in an example:

A source node has selected and sent a data packet towards a neighbor. During a certain timeout, the source node has failed to receive an ACK message from the neighbor. Thus, the source node generates and applies a negative reward value to the chosen action, which at the first step is equal to −1.

At the second step, a node selects and sends the next packet to the same neighbor and does not receive an ACK message as well. Thus, it generates a new negative reward value according to formula 6, which then is equal to:

−1*exp((2−1)/2)=−1.65.

Figure 16:
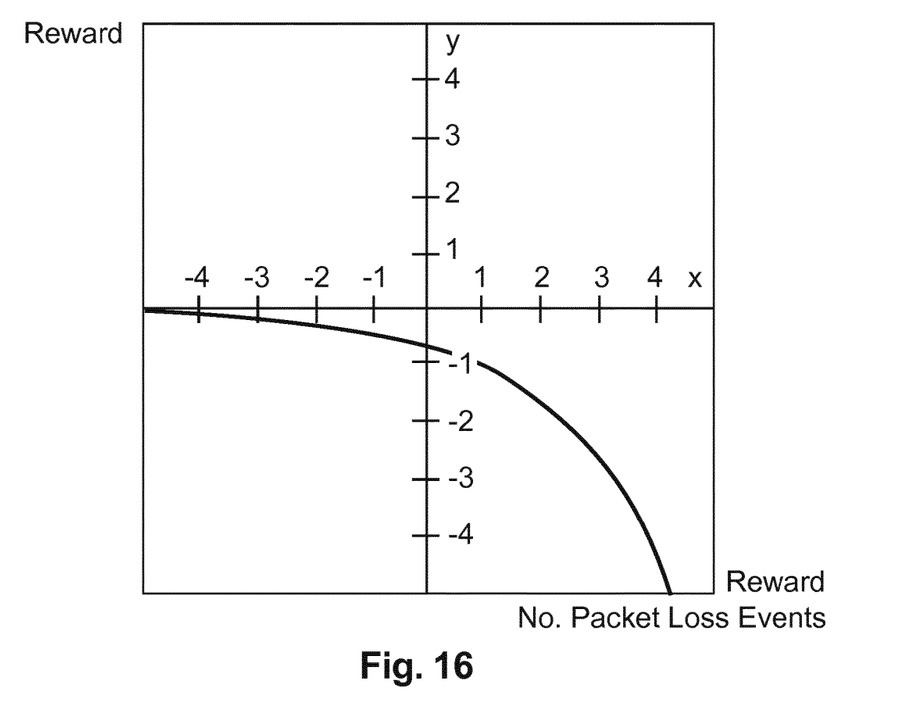
FIG. 16 shows an example of the negative reward value enhancement according to a further proposal in dependence on the number of subsequent packet losses.

In further steps, the negative reward value will be strongly amplified due to the exponential function as illustrated in FIG. 16. Note that negative values n are not defined even though the FIG. 16 shows the calculated results for such values.

It is to be understood that the proposed method and apparatus may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). Preferably, the proposed method and apparatus is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

It is to be further understood that, because some of the constituent system components and method steps depicted in the accompanying figures are preferably implemented in software, the actual connections between the system components (or the process steps) may differ depending upon the manner in which the proposed method and apparatus is programmed. Given the teachings herein, one of ordinary skill in the related art will be able to contemplate these and similar implementations or configurations of the proposed method and apparatus.

REFERENCE LIST

[1] Ahmed A., Hongchi Shi, and Yi Shang *A Survey on Network Protocols for Wireless Sensor Networks*, IEEE, 2003.

[2] David B. Johnson, David A. Maltz, and Josh Broch. DSR: *The Dynamic Source Routing Protocol for Multi-Hop Wireless Ad Hoc Networks*. in Ad Hoc Networking, edited by Charles E. Perkins, Chapter 5, pp. 139-172, Addison-Wesley, 2001.

[3] C. Perkins, E. Belding-Royer, and S. Das, *Ad hoc On-Demand Distance Vector (AODV) Routing*, IETF RFC 3561, July 2002.

[4] T. Clausen and P. Jacquet. *Optimized Link State Routing Protocol (OLSR)*. RFC 3626 (Experimental), October 2003.

[5] A. Neumann, C. Aichele, M. Lindner, and S. Wunderlich, *Better Approach To Mobile Ad-hoc Networking (B.A.T.-M.A.N.)*, IETF Draft 2008.

[6] Perkins Charles E., Bhagwat Pravin: *Highly Dynamic Destination-Sequenced Distance-Vector Routing (DSDV) for Mobile Computers*, London England UK, SIGCOMM 94-8/94.

[7] IEEE Draft Standard for Information Technology-Telecommunications and information exchange between systems-Local and metropolitan area networks—Specific requirements—Part 11: Wireless LAN Medium Access Control (MAC) and Physical Layer (PHY) specifications-Amendment 10: *Mesh Networking*, IEEE P802.11s/D10.0, March 2011, pp. 1-379, 29 2011.

[8] R. S. Sutton and A. G. Barto, *Reinforcement Learning: An Introduction*. The MIT Press, March 1998.

[9] Chang, Y.-H., Ho, T.: Mobilized ad-hoc networks: *A reinforcement learning approach*. In: ICAC 2004: Proceedings of the First International Conference on Autonomic Computing, pp. 240-247. IEEE Computer Society, USA (2004).

[10] Landau, Lev Davidovich & Lifshitz, Evgeny Mikhailovich (1980) [1976]. Statistical Physics. Course of Theoretical Physics. 5 (3 ed.). Oxford: Pergamon Press. ISBN 0-7506-3372-7.

The invention claimed is:

1. A method of adaptive route selection performed in a node of a wireless mesh communication network, said method comprising:
  performing, in a source node (S), a path discovery procedure for determining a path from said source node (S) to a destination node (D) in said wireless mesh communication network,
    wherein said path discovery procedure comprises
      broadcasting a route request message (RREQ) by said source node (S), and
      broadcasting said route request message (RREQ) in a number of hops by one or more nodes having received said route request message (RREQ);
  broadcasting from said destination node (D) a route reply message (RREP) in response to the reception of said route request message (RREQ),
  re-broadcasting said route reply message in a number of hops by one or more nodes having received said route reply message (RREP); and
  performing a procedure of reinforcement learning in the path discovery procedure, said procedure of reinforcement learning comprising, in a receiving node which has received said route request message (RREQ) or said route reply message (RREP) of a corresponding broadcast action:
    estimating a reward value (Qx) for the corresponding broadcast action, and
    updating a route table (RT) with said corresponding estimated reward value (Qx) for the corresponding broadcast action in which a reward function is used for estimating said reward values (Qx) in the path discovery procedure, the reward values being dependent from a receiving signal strength indicator RSSI measured during reception of said route request message (RREQ) or route reply message (RREP) and the number of hops the route request message (RREQ) or the route reply message (RREP) has propagated in the network to reach the receiving node.

2. Method according to claim 1, wherein the reward function is defined in a form:

$$\begin{cases} \text{reward} = f(RSSI, N_{hops}) = \frac{RSSI_{min}}{RSSI * N_{hops}}, & \text{if } RSSI \neq 0 \\ \text{reward} = f(RSSI, N_{hops}) = \frac{|RSSI_{min}|}{N_{hops}}, & \text{if } RSSI = 0 \end{cases}$$

where reward is a resulting estimated reward value for the corresponding broadcast action to send a message to a next neighbor from which the route request message (RREQ) or the route response message (RREP) has been received, where $RSSI_{min}$ is the minimum possible value of the receiving signal strength indicator RSSI, which can be measured by a wireless network interface (WI), and where $Nh_{ops}$ corresponds to the number of hops said route request message (RREQ) or said route reply message (RREP) has propagated through said wireless mesh network until it was received by said receiving node.

3. Method according to claim 1, wherein $RSSI_{min}$ is measured in dBm values varying in a range of [-100, 0], where Zero in this range corresponds to the strongest received signal.

4. Method according to claim 1, wherein the routing table (RT) is updated during an overall packet forwarding procedure in which said path discovery procedure is not performed, wherein a procedure of reinforcement learning is also used for the overall packet forwarding procedure, the overall packet forwarding procedure comprising estimating reward values in which a feedback reward function is used and defined in a form of:

$$\begin{cases} \text{reward} = \frac{Q_{avg}}{|RSSI|}, & \text{if } RSSI \neq 0 \\ \text{reward} = Q_{avg} * m, & \text{if } RSSI = 0 \end{cases}$$

where m is a multiplication coefficient, which increases the reward value, when the receiving signal strength indicator RSSI achieves the maximum value Zero, wherein the multiplication coefficient is in a range: [1, 100], and where $Q_{avg}$ is a calculated average estimated reward value, calculated from the received reward values at the sending node in feedback messages (ACK) for a transmission from the sending node.

5. Method according to claim 4, wherein $Q_{avg}$ is calculated according to a formula $$Q_{avg} = \frac{\sum Q_{DST\,IP}}{N_{values}}$$

where $Q_{DST\_IP}$ is the estimated reward value for a transmission from the sending node in a direction of the destination node (D), where $N_{values}$ is a number of values from which the average is to be calculated.

6. Method according to claim 1, wherein a node takes a next-hop decision at a step number t based on selection probabilities which are calculated with a probability distribution function $P_t(a)$, where $P_t(a)$ is a probability of choosing next hop transmission action a at the step number t.

7. Method according to claim 6, wherein the probability distribution function $P_t(a)$, corresponds to a Gibbs-Boltzmann distribution function according to a formula:

$$P_t(a) = \frac{e^{\frac{Q_t(a)}{\tau}}}{\sum_{i=1}^{n} \frac{Q_t(b_i)}{\tau}}$$

with $Q_t(a)$ being the estimated reward value of next hop transmission action a at a current step t, with $Q_t(b_i)$ being the estimated reward value of alternative next hop transmission action $b_i$ at the current step t, and with $\tau$ being a positive temperature parameter for the Gibbs-Boltzmann distribution, and i being an index value.

8. Method according to claim 6, wherein a temperature parameter is adaptively defined in dependence of a current packet loss rate PLR.

9. Method according to claim 8, wherein the temperature parameter is adaptively defined according to a formula:

$$\begin{cases} \tau(PLR) = t_0, & \text{if } PLR \leq 1 \\ \tau(PLR) = t_0 * k * (PLR - 1) + t_0, & \text{if } PLR > 1 \end{cases}$$

where k is a growth coefficient equaling 0.5 by default and varying in a range [0, 1];

and $t_0$ is an initial value of the temperature parameter taken from a range [0, 1000].

10. Method according to 9, wherein the current packet loss rate PLR is calculated according to a formula $$PLR = \frac{N_{lost\ packets}}{N_{total\ sent\ packets}} * 100$$

where $N_{lost\ packets}$ is the current number of lost packets and the number of total sent packets $N_{total\ sent\ packets}$ is in a range of [0, 100].

11. Method according to claim 1, wherein in a case that a packet is lost on said path, the sending node generates a negative reward value and uses it in said procedure of reinforcement learning to update the route table (RT) in order to mark the path as less attractive for further transmissions.

12. Method according to claim 11, wherein an exponential increase in the negative reward value is applied when a number of successive packet losses occur.

13. Method according to claim 12, wherein the exponential increase of the negative reward value is calculated according to a formula:

$$reward_{negative} = f(n) = -1 * e^{\frac{n-1}{2}}, n \geq 2$$

where n corresponds to the number of subsequent packet loss events, wherein for n =1 the negative reward value is set to −1.

14. An apparatus for a wireless network node having WLAN circuitry for sending and receiving messages in a wireless mesh network and further having a routing table in which for each link to a direct neighbor of said wireless network node it is recorded an estimation value representing a success ratio of a packet routed into the direction of said link reaching said direct neighbor, the apparatus having an agent configured to perform a path discovery process according to claim 1.

15. A non-transitory computer-readable storage medium having stored thereon a computer program, said computer program comprising program code which, when read from the storage medium and executed in a computing system, causes the computing system to perform the method of claim 1.

* * * * *